(12) United States Patent
Ham et al.

(10) Patent No.: US 7,226,568 B1
(45) Date of Patent: Jun. 5, 2007

(54) PLURAL CONDUIT REPLACEABLE OUTER SUPPORT STRUCTURE FOR RADIAL FLOW SYSTEM

(75) Inventors: Pierre M. Ham, Bougival (FR); Alain M. Blanchon, Noisy le Roi (FR); Philippe O. Lavernhe, Poitiers (FR); Hossein A. Naderi, Poitiers (FR)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/522,118

(22) Filed: Mar. 9, 2000

(51) Int. Cl.
*B01J 8/02* (2006.01)

(52) U.S. Cl. .................... 422/218; 422/220; 422/311

(58) Field of Classification Search ........ 422/211–212, 422/216, 218–221, 239, 176, 181; 34/582–584, 34/174; 96/139, 152; 210/291, 286
See application file for complete search history.

(56) References Cited

U.S. PATENT DOCUMENTS

| 2,634,194 A | | 4/1953 | Nebeck ........................ 422/218 |
| 3,167,399 A | | 1/1965 | Hansen, Jr. ................. 422/217 |
| 4,167,553 A | | 9/1979 | Persico et al. .............. 422/216 |
| 4,198,002 A | * | 4/1980 | McClain ...................... 239/568 |
| 4,374,094 A | | 2/1983 | Farnham ..................... 422/218 |
| 4,374,095 A | | 2/1983 | Legg et al. .................. 422/218 |
| 4,540,547 A | | 9/1985 | Schuurman .................. 422/49 |
| 4,971,771 A | * | 11/1990 | Stahl ........................... 422/218 |
| 5,118,419 A | | 6/1992 | Evans et al. ................. 210/291 |
| 5,209,908 A | | 5/1993 | Koves et al. ................. 422/218 |
| 6,224,838 B1 | * | 5/2001 | Schulz et al. ................ 422/218 |

FOREIGN PATENT DOCUMENTS

EP      0483975 A1     5/1992

* cited by examiner

*Primary Examiner*—Glenn Caldarola
*Assistant Examiner*—Jennifer A. Leung
(74) *Attorney, Agent, or Firm*—Patterson & Sheridan, L.L.P.

(57) ABSTRACT

Replaceable outer support structure 38 for a particulate material bed 70 in a radial flow system comprises a plurality of hollow conduits 50, 250, 260, at least some of which have a generally trapezoidal cross-section. The conduits are arranged in a ring around the inside wall surface 39 of the vessel 42 and have flat or slightly concave inner wall surfaces 52 formed of segments of vertically extending screen members which have slots or openings 86 which provide uniform flow through the uniform thickness particulate bed which they help define The side walls 54, 56 of the conduits extend generally radially outwardly to engage the inner surface 39 of the outside wall 40 of the vessel and at least those of them which have a trapezoidal cross-section have their side walls formed at an included angle α which is less than if they extended radially relative to the axis of the vessel. An embodiment having alternating generally trapezoidal 250 and generally rectangular cross-sections 260 for the conduit members maximizes the total internal flow area of the ring of conduits as compared to an embodiment in which all of the conduit members have a trapezoidal shape, while still allowing the inward movement of individual conduit members during installation or replacement operations.

23 Claims, 2 Drawing Sheets

PLURAL CONDUIT REPLACEABLE OUTER SUPPORT STRUCTURE FOR RADIAL FLOW SYSTEM

BACKGROUND OF THE INVENTION

1) Field of the Invention

The invention relates to the fluid conduits which form the outer retaining wall for an annular particulate bed used in a radial flow system mounted in a cylindrical vessel. In such systems a fluid typically is directed radially inwardly or outwardly into or out of the particulate bed through openings in the inner surfaces of a plurality of outer, vertically arranged conduit members or through openings in a cylindrical screen basket member which has a smaller diameter than the inner wall of the vessel. The fluid passes through openings in a vertically arranged center pipe which forms the inner retaining wall for the annular particulate bed.

2) Description of the Related Art

The vessel typically is a reactor which contains a bed of particulate material such as catalyst, absorbent, resins or activated carbon. The fluid which passes through the particulate bed in a radial direction is usually a gas but it could also be a liquid or a liquid/gas mixture. In prior art systems the outer wall support for the annular particulate bed is often a ring of individual scallops members which have convex inner surfaces and outer surfaces which conform to the wall of the vessel. The scallops members can be formed from metal plates which contain perforations smaller in diameter than the size of the particulate material. They can also be formed with their convex inner surface comprising a screen element having a plurality of closely spaced wires welded to support rods. Such scallops are often sized so they can be installed or replaced when required by lifting them through an opening in the top of the vessel. Although the convex surface of the scallops which supports the particulate bed is quite strong, the convex shape causes the thickness of the annular bed to be non-uniform. Thus, the flow distribution through the bed is non-uniform and more flow will take place at the location on the scallops where their convex surface is closest to the center pipe and the pressure drop is lowest. Since the bed must usually have a predetermined minimum thickness, the convex scallops shape means that additional particulate material must be provided to fill all of the space which is radially outwardly of a circle containing the radially innermost portion of the scallops. Where the particulate material is one which contains a precious metal such as platinum, the need for additional material can be very expensive. In addition, the tendency for flow to take place where the flow distance is at its shortest results in uneven contact between the fluid to be reacted and the particulate material in the bed. This uneven flow can result in the need to replace the particulate material sooner than if the flow was entirely uniform.

Another type of prior art system includes a cylindrical screen basket member which is spaced inwardly from the outer wall of the vessel. Such a cylindrically shaped screen basket member cooperates with an inner screen pipe member to cause the particulate bed positioned between such inner and outer members to have a uniform thickness. However, the systems is quite expensive since the large diameter screen cannot be installed or removed through a small upper opening in the vessel, as can the scallops type screen.

Examples of prior art systems which have scallops members around the inside surface of the outer vessel wall include Hansen, Jr. U.S. Pat. No. 3,167,399 and Koves et al U.S. Pat. No. 5,209,908. Farnham U.S. Pat. No. 4,374,094 shows vertical screen segments surrounding an annular catalyst bed which are spaced from the side wall of the vessel. Schuurman U.S. Pat. No. 4,540,547 shows a moving bed reactor wherein a ring of screen segments surrounds a centrally located catalyst bed and separates the catalyst from the outer annular chamber which receives the effluent after it passes through the screen surfaces. Nagaoka E. P. Publication 0 483 975 A1 shows a device for holding particulate catalyst in a radial flow reactor which comprises a ring of vertically arranged containers having abutting side walls and screened inner walls, the containers being filled with catalyst and positioned between an annular outer fluid chamber and an inner cylindrical fluid chamber.

SUMMARY OF THE INVENTION

It is among the objects of the present invention to provide an outer support structure for the particulate bed in a radial flow system which is relatively simple to install initially or when replacement is necessary by making it in individual segments which are sized so that each segment can easily be removed and can pass through a relatively small inlet opening in an end of the vessel. It is another object to provide such an outer support structure which is strong and capable of transferring outward loading applied to it by the particulate bed directly to the walls of the vessel without being deformed. It is yet another object to provide such a structure which will provide a uniform bed thickness. It is a still further object to provide such a structure in which each individual segment has a large cross-sectional area for flow to allow low flow velocities for the fluid and less turbulence. Yet another object is to provide a support structure which allows the vessel diameter to be reduced for a given thickness of particulate bed as compared to a vessel incorporating scallops. These and other objects are achieved by the mounting system of the present invention wherein a plurality of vertically extending flow conduits having an open end for receiving or distributing flow are positioned adjacent each other in a ring around the inner circumference of the outer wall of the vessel. The inner walls of the conduits comprise a screen surface which defines the outer support structure for the particulate bed and includes flow openings which are of a lesser width than the diameter of the particulate material. The screen surface is preferably formed of parallel, closely spaced wires which are welded to underlying support rods. The screens which form the inner walls are preferably flat or slightly concave so that the particulate bed which extends between them and a circular center pipe screen member will have a substantially constant radial thickness. At least some of the flow conduits have a generally trapezoidal shape. The flow conduits have an outer wall which lays against the inside vessel wall and has a radius that is the same as that of the inside vessel wall. Generally radially extending side wall portions of the conduits have such angles and clearance between adjacent conduits that any individual conduit can be moved inwardly with no more than a small sliding displacement of adjacent conduits or by removal of a maximum of one adjacent conduit.

In a first embodiment, all of the conduits have a generally trapezoidal cross-section which allows any one conduit to be moved radially inwardly without affecting any other conduit. In a second embodiment, alternate conduits are generally trapezoidal and generally rectangular and the adjacent side wall of adjacent conduits are generally parallel. This relationship provides a total internal flow area that is greater than that which is possible in the first embodiment where the inner wall surfaces of adjacent conduits must be circumferentially spaced from each other by a distance which is sufficient to allow one conduit to be moved radially inwardly without affecting adjacent conduits. In the second embodiment, a generally rectangularly shaped conduit must be moved radially inwardly before an adjacent generally trapezoidally shaped conduit can be removed. All of the conduits are sized so that their cross-sectional area and shape is less than that of the opening in the top of the vessel so that individual conduits may be inserted or removed through said opening.

DETAILED DESCRIPTION OF THE INVENTION

Figure 1:
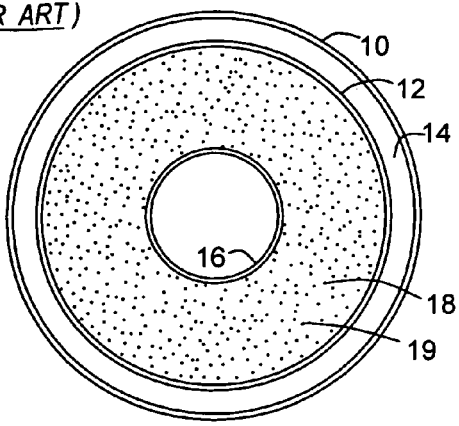
FIG. 1 is a horizontal cross-section of a typical prior art vessel in which the outer portions of the particulate bed are supported by a screen basket in the form of a cylindrical screen member which is spaced from the outer wall of the vessel.
Figure 4:
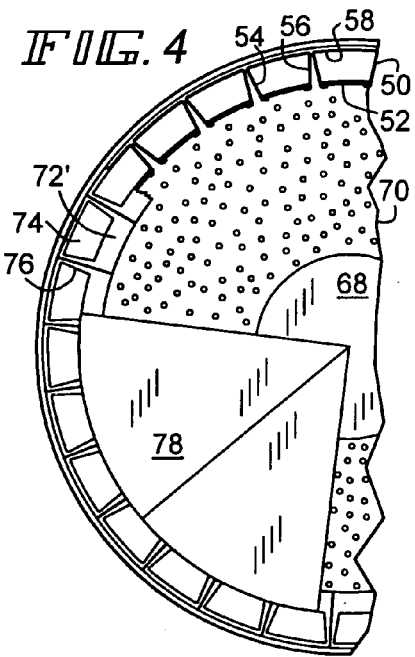
FIG. 4 is a fragmentary horizontal cross-sectional view taken inside the vessel of FIG. 3 at a location above the conduits.
Figure 2:
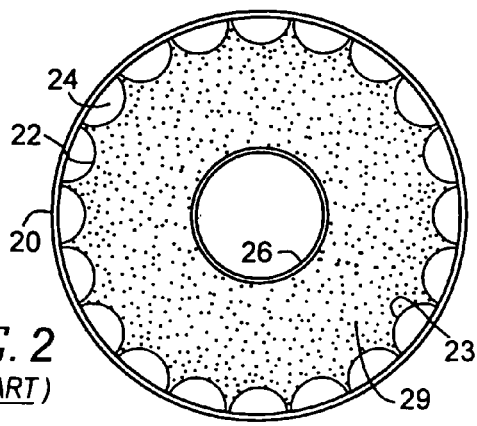
FIG. 2 is a horizontal cross-section of a typical prior art vessel in which the outer portions of the particulate bed are supported by a plurality of hollow scallops members which are in contact with the outer wall of the vessel and have convex inner surfaces in contact with the particulate bed.

FIG. 1 is a cross-sectional view similar to FIG. 2 and FIG. 4 which illustrates one type of construction used for a prior art radial flow reactor vessel (not shown). A vertical, generally cylindrical outer wall member 10 cooperates with a cylindrical outer screen basket member 12 to define an outer annular opening 14. The screen basket member 12 is concentrically located relative to a center mounted vertical screen pipe 16 to define the outer and inner walls of an inner annulus area 18 which is packed with an annular bed of particulate material 19 such as a catalyst. In normal use, the fluid to be processed enters an inlet opening (not shown) at the top of the vessel and passes into the outer annular opening 14. The fluid then passes radially inwardly through openings (not shown) in the screen basket 12, through the annular bed of particulate material 19, through openings (not shown) formed in the center mounted screen pipe 16 and then moves downwardly through the screen pipe to an outlet portion of the vessel (not shown). Although the movement of fluid has been described as moving from top to bottom, it could also move in the reverse direction. The radial thickness of the particulate bed 19 is quite uniform. However, since the outer screen basket 12 is of a very large diameter, it could not be installed or removed from a vessel having the usual small diameter inlet opening unless the top of the vessel was welded to the side walls or made so that it could be bolted to the side walls, a very expensive type of construction.

FIG. 2 shows a more typical type of construction used for a prior art radial flow reactor vessel. A vertical, generally cylindrical outer wall member 20 supports a plurality of vertically extending scallops members 22 which are mounted in a ring around the inside circumference of the outer wall member 20 and include a plurality of hollow internal opening portions 24. The scallops members 22 each have a convex surface 23 in contact with the particulate bed 29 which includes openings (not shown) which are smaller than the particles in the bed. In normal use, the fluid to be processed enters the inlet opening of the vessel (not shown) and passes into the open upper ends of the plurality of hollow internal opening portions 24 formed in the scallops. The fluid then passes radially through the openings in the convex surfaces 23 of the scallops members 22, through the bed of particulate material 29, through the openings (not shown) formed in the outer surface of the center mounted screen pipe 26 and downwardly through the screen pipe and out an outlet opening portion (not shown) at the bottom of the screen pipe 26. Although the movement of fluid has been described as moving from top to bottom, it could also move in the reverse direction. An advantage of the scallops type configuration, is that one can move the individual scallops members 22 through a rather small inlet opening (not shown) in the top of the vessel during initial installation or replacement and thus avoid the problems noted with the large diameter screen basket arrangement noted supra. A significant disadvantage is that the radial thickness of the particulate bed 29 is not uniform and the flow into and through the bed is therefore not uniform. For example, greater flow would tend to take place at the center of the convex surfaces 23 of the scallops where the distance to the center screen pipe 26 is least. Although uniform flow is always desirable, it is especially desirable where the particulate material is a catalyst coated with an extremely expensive precious metal. The processing expense can be minimized if all of the particulate material in the particulate bed is contacted equally by the fluid being processed. However, in a convex scallops configuration, the particulate material which is adjacent the radially outermost side edge portions of the convex scallops members will be at a greater distance from the center screen pipe than the particulate material which is at the center of the convex surfaces. Since the pressure drop across the particulate bed is lowest where the flow distance is shortest, greater flow will tend to take place in such central regions. Lesser flows in other regions will result in underutilization of the particulate material in the reaction. The different rates of flow can possibly cause erosion of the particulate matter where the flow rate is highest and can certainly produce a situation where the particulate material has to be replaced sooner than if the flow was so uniform that all particles in the particulate bed would be contacted equally.

Figure 3:
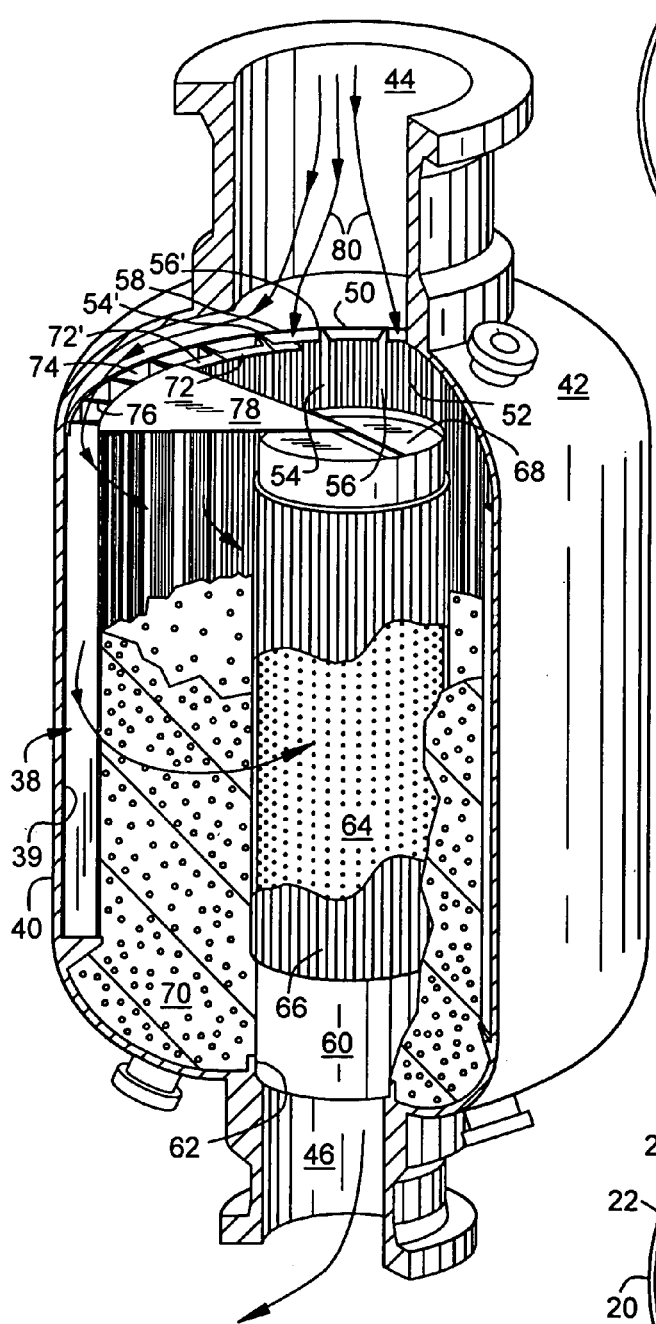
FIG. 3 is a partially broken away isometric view illustrating a preferred embodiment of the invention in which the outer portions of the particulate bed are supported by a ring of conduits which are in contact with the outer wall of the vessel.

FIG. 3 is a partially broken away isometric view showing the improved outer support structure indicated generally at 38 in contact with inner wall surface 39 of the outer wall 40 of a radial flow reactor vessel 42. The vessel 42 has an inlet opening 44 at its top and an outlet opening 46 at its bottom. The support structure 38 comprises a plurality of generally trapezoidal shaped vertical conduit members 50. The conduit members 50 have inner wall surfaces 52 in the form of a screen through which radial fluid flow can take place. A first side wall surface 54 and a second side wall surface 56 extend toward the outer wall 40 and have rear end portions 54' and 56' in contact with the inner surface 39 of the outer wall 40. An outer wall portion 58 is preferably provided between and integral with the side wall surfaces 54, 56. A center screen pipe member 60 is mounted in a recess 62 at the bottom of the vessel 42. The center screen pipe member 60 includes a center pipe portion 64 which is perforated along at least a major portion of its length, with the perforations being covered by an outer screen portion 66. At its upper end the screen pipe member 60 is closed off by an end cap member 68. An annular bed 70 of particulate material such as a catalyst is positioned between and supported by the screen portion 66 on the center pipe member 60 and the inner wall surfaces 52 of the conduit members 50. Top plate members 72 are placed in a ring around and in contact with the upper surfaces of the conduit members 50. The top plate members 72 include inlet opening portions 74 which allow fluid passing downwardly through the inlet opening 44 in the vessel 42 to enter the interior of the conduit members 50 while sealing off downward flow between adjacent conduits. Flat support portions 76 which surround the opening portions 74 rest on top of the conduits 50 and may be fastened thereto in any suitable manner. To prevent inlet flow through the inlet opening 44 from contacting the particulate bed 70 before entering the conduits 50, a series of pie shaped cover plates 78 are attached to each other and to the inner edge portions 72' of the top plate members 72 in any suitable manner. The fluid flowpath through the vessel 42 is indicated by the arrows 80 and shows that the flow passes vertically down the hollow insides of the conduits 50, radially through the particulate bed 70, through the openings in the inner screen portion 66 and perforated center pipe portion 64 and downwardly through the outlet opening 46.

FIG. 4 is a fragmentary cross-sectional view looking downwardly from a location just above the cover plates 78 in FIG. 3 and illustrates how the radial thickness of the annular particulate bed 70 is uniform as compared to the variable thickness of the prior art bed 29 shown in FIG. 2.

Figure 6:
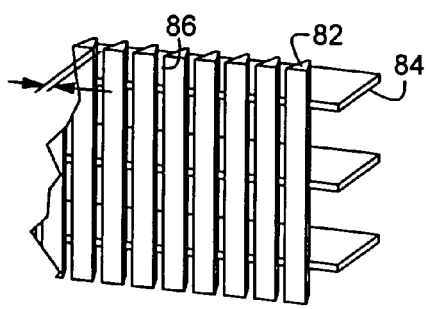
FIG. 6 is an isometric view showing an enlarged portion of the screen which forms the inner wall of each of the conduit members shown in FIG. 5.
Figure 5:
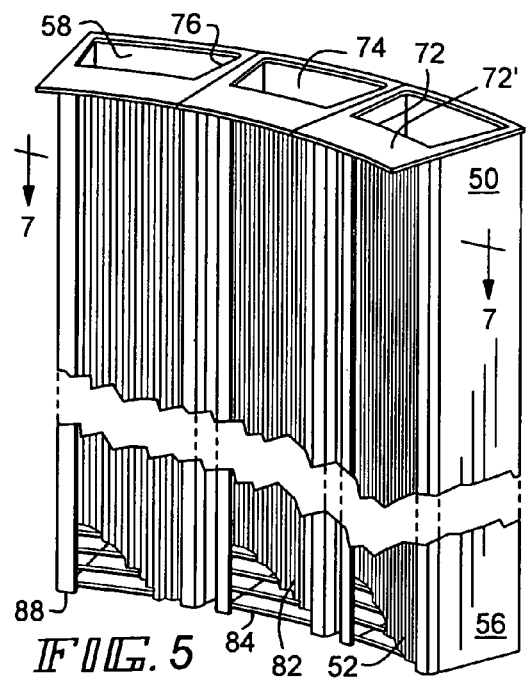
FIG. 5 is an enlarged isometric view showing three of the conduit members in FIG. 3 with upper sealing plates covering their top surfaces.

FIGS. 5 and 6 are enlarged views showing details of the construction of conduits 50 and the top plates 72. The views particularly show the preferred construction of the screen which forms the surface of the conduit inner wall surface 52. A plurality of vertical screen wires 82 are welded to a plurality of support rods 84 at a spacing which forms flow slots or openings 86 which have a lesser width $W_d$ than the size of the particulate matter forming the bed 70. Angular corner members 88 retain the inner wall surface or screen member 52 by being welded to the side walls 54, 56 and tack welded to the screen members 52. Although the inner wall surface 52 is shown as being slightly concave so as to cause the radial thickness of the particulate bed 70 to be substantially constant, a flat surface would provide a very close approximation and would also produce a substantially constant radial bed thickness. The inner wall surface 52 is shown as being equidistant from the outer wall surface 58 along its vertical length, but it could also be tapered.

Figure 7:
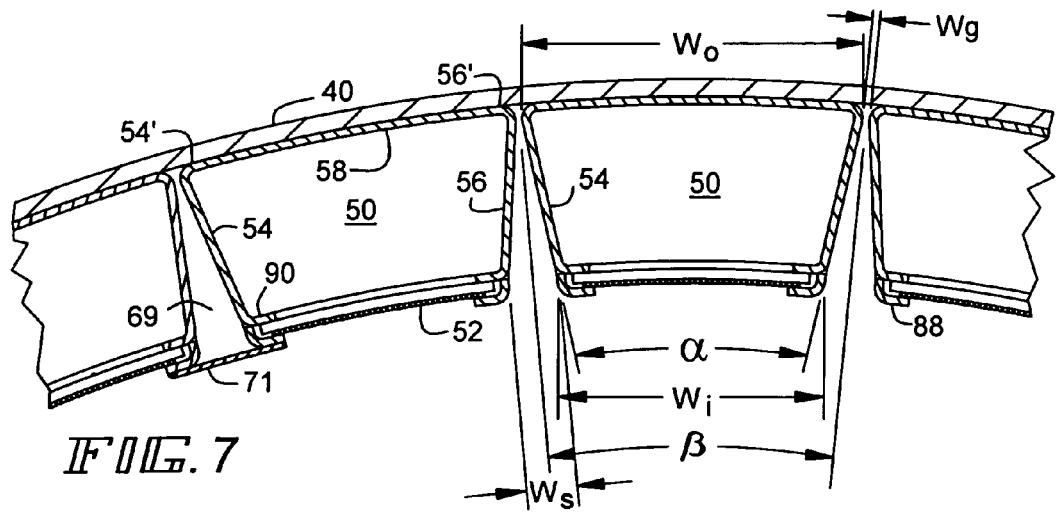
FIG. 7 is a horizontal cross-sectional view taken on line 7—7 of FIG. 5.

FIG. 7 is an enlarged cross-sectional view taken on line 7—7 of FIG. 5 which illustrates the relationship between adjacent conduits 50. The conduits have an outer wall portion 58 of width $W_o$ which must be of sufficiently greater width than the width W1 of inner wall portion 52 as to enable an individual conduit 50 to be moved radially inwardly to a location where it could be moved through the opening 44 (FIG. 3) for replacement. The side wall portions 54, 56 of each conduit 50 are preferably positioned at an angle α which is less than the angle β which the sides wall portions would have if the side walls 56, 54 of adjacent conduits were parallel to each other and positioned normal to the inner wall surface 39 of the vessel outer wall 40. The adjacent conduits 50 are preferably spaced a slight distance apart so as to provide a small gap $W_g$ which will allow for manufacturing tolerances as well as possible thermal expansion of the outer wall portion 58 relative to the outer wall 40 during operation of the reactor. For example, in a situation where $W_o$ is 256 mm, and the inner diameter of the outer wall 40 is 2.345 m, a gap wherein $W_g$ equals 4.5 mm has been found to be satisfactory. Preferably, $W_g$ is 1.5–2% of $W_o$. To maximize the internal volume of the conduits 50, and ignoring the width of gap $W_g$, the width $W_i$ of the inner wall surface 52 should be equal to the width $W_o$ of the outer wall surface 58 less the width $W_s$ which is the distance between the radially innermost corner portions 88 of adjacent side walls 56, 54. The corner portions 88, which are shown to be angle members, are preferably welded to the side wall surfaces 54, 56 and tack welded to the inner wall or screen members 52. The corner portions 88 hold the screen members 52 in contact with flange portions 90 which extend from the side walls 54, 56. To prevent particulate material from entering the triangular open space 69 between adjacent conduits, a sealing plate 71 is preferably welded to the same single corner portion 88 on each conduit. The sealing plates are preferably of a thinner material than the wall portions of the conduit and of a width sufficient to cover the open space 69 and rest on the corner portion 88 of the adjacent conduit member. The pressure applied to the sealing plates 71 by the weight of the particulate material will ensure a tight seal. For clarity purposes, only one sealing plate 71 is shown in FIG. 7.

Figure 8:
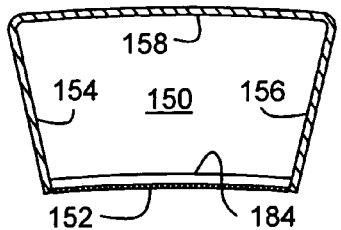
FIG. 8 is a cross-sectional view of a modified conduit cross-section which is similar to the conduit cross-section shown in FIG. 7 except for the manner in which the screen member forming the inner wall is mounted to the side walls.

FIG. 8 shows a modified conduit 150 similar to FIG. 7 in that the side wall portions 154, 156 are integrally formed with a rear wall portion 158. However, rather than having separate angle members serving to retain the inner wall surface 152, in this embodiment the inner wall surface 152 may be plug welded to the side wall portions 154, 156 by drilling holes (not shown) in the side wall portions at locations where the support rods 184 can be aligned with the holes. By welding to the support rods rather than the screen wires, the integrity of the screen surface can be maintained.

Figure 9:
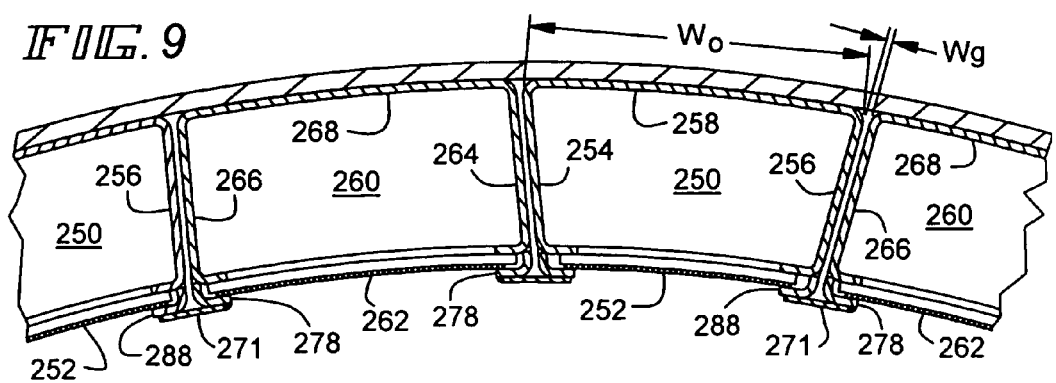
FIG. 9 is a horizontal cross-sectional view similar to FIG. 7 which shows a modified design in which alternating conduits have generally trapezoidal and generally rectangular shaped cross-sections.

FIG. 9 shows a modified design in which alternating conduits 250, 260 have generally trapezoidal and generally rectangular shaped cross-sections, respectively. The combination of shapes maximizes the total inside cross-sectional flow area of the ring of conduits, causing it to be slightly greater than that provided by the embodiment of FIG. 7 and substantially greater than that provided by the prior art scallop shaped conduits illustrated in FIG. 2. This combination of complementary shapes also eliminates the small void space 69 between conduits which is present in the embodiment of FIG. 7 and thereby eliminates the chance that particulate material can be wasted in a location where it will serve no purpose. The side walls 254, 256, outer wall 258 and inner wall portion 252 of the trapezoidal shaped conduits 250 correspond to similarly numbered elements 50–58 in FIG. 7. The generally rectangular shaped conduits 260 have inner wall portion 262 and side wall portions 264, 266 which are parallel to each other and are also parallel to the angled side wall portions 254, 256 of adjacent trapezoidal shaped conduits 250. As noted in the description of FIG. 7, a small gap $W_g$ is preferably provided between the adjacent conduits 250, 260 to provide a tolerance for manufacturing and also allow for any thermal expansion that might take place during use. If desired, each of the rectangular shaped conduits 260 can have a sealing plate 271 welded to its corner portion 278 to ensure that particulate material cannot enter the gaps $W_g$. The sealing plates 271 are attached only to the rectangular shaped conduits, and have a width sufficient to cover the corner portions 288 of the trapezoidal shaped conduits 250. They are preferably of less thickness than the wall portions 264, 266 and 268 so that the radial outward pressure applied to their surfaces by the annular bed of particulate material 70 will produce a tight seal against the corner portions 288.

The trapezoidal shape of conduits 50 in the embodiment shown in FIG. 7 and the combination of trapezoidal and rectangular shaped conduits 250 and 260 in the embodiment shown in FIG. 9 provide an improvement in cost and ease of replacement as compared to the prior art construction shown in FIG. 1 while closely approximating the uniformity of flow distribution which is possible with a cylindrical outer screen basket member. The disclosed conduit shapes also offer the ease of installation and replacement possible with the convex scallops arrangement of FIG. 2 while achieving a highly uniform flow distribution through the particulate bed 70 which is not possible with the convex scallops arrangement. In addition, for conduits 50, 250 or 260 having the same width $W_o$ as the scallops members 22 of FIG. 2, the interior cross-sectional area can be much larger for the same radial depth. This larger area results in a lower velocity vertical flow rate, less turbulence, and far more uniform flow through the entire inner screen surface 52. This is especially true for the embodiment shown in FIG. 9. Alternatively, the radial thickness of the conduits 50, 250 or 260 could be reduced to a distance which is considerably less than the depth of the scallops 22 while still having an equal or greater internal cross-sectional area. In the latter situation, for a given radial thickness of the particulate bed 70, the vessel 42 could have a smaller outer diameter and thus be manufactured for a lower cost.

While the invention has been particularly shown and described with reference to the preferred embodiments thereof, it will be understood by those skilled in the art that various alterations in form and detail may be made therein without departing from the spirit and scope of the invention.

We claim:

1. Apparatus for supporting and retaining particulate material in a radial flow vessel having inlet and outlet openings for a fluid to pass through the vessel, one of said inlet and outlet openings being in communication with an annular space defined on its outer side by an inner wall of the vessel and the other of said inlet and outlet openings being in communication with an interior of an axially mounted member whose outer surface has openings therein which are smaller than the particulate materials supported thereby, comprising:

a ring of separate, hollow conduit members positioned against the inner wall of said vessel and arranged in a vertical direction to fill said annular space, said separate hollow conduit members each having an internal cross-sectional area defined by a pair of generally radially extending side wall portions and an inner wall portion integrally joined to each of said pair of generally radially extending side wall portions, wherein the inner wall is concave shaped, wherein the outer ends of said generally radially extending side wall portions of adjacent conduit members being in contact with said inner wall, wherein said pair of generally radially extending side wall portions on at least some of said conduit members being angled away from each other in a generally radially outward direction but at an included angle which is less than if they were truly radial relative to the axis of the vessel, wherein the included angle being sufficiently small as to permit individual conduit members to be moved inwardly relative to adjacent conduit members during an installation or replacement operation, and wherein said inner wall portions of said conduit members having at least a portion of their surface formed by screen members which have flow openings which are of a dimension less than the diameter of the particulate material which forms a uniform thickness particulate bed and which is located in an annular space between the inner wall portions of the conduit members and the outer wall of the axially mounted member.

2. Apparatus in accordance with claim 1 wherein the end portions of the radially extending side wall portions of each conduit member are joined by an outer wall portion.

3. Apparatus in accordance with claim 2 wherein the side wall portions and the outer wall portion of said conduit members are formed from a single sheet of metal.

4. Apparatus in accordance with claim 1 wherein said screen members comprise parallel wires spaced to form slots, said parallel wires being arranged in a vertical direction.

5. Apparatus in accordance with claim 1 wherein the inner wall portions are equidistant from the outer wall portions along their length.

6. Apparatus in accordance with claim 1 wherein said screen members which form at least a portion of said inner wall portions are retained between flange portions extending from each of said side wall portions and an angle member which is fixed to said side wall portions.

7. Apparatus in accordance with claim 1 wherein radially outer ends of said generally radially extending side wall portions which contact the inner wall of said vessel are not joined to each other.

8. Apparatus in accordance with claim 1 wherein the conduit members have a cross-sectional area and shape which is smaller than an opening in the top of the vessel, whereby individual conduit members are inserted into or removed from the vessel through said opening.

9. Apparatus in accordance with claim 1 wherein said ring of separate hollow conduit members which are positioned against the inner wall of said cylindrical vessel are slightly spaced from each other sufficiently to accommodate manufacturing tolerances or thermal expansion during operation of said radial flow vessel.

10. Apparatus in accordance with claim 9 wherein said conduit members are spaced from each other by a distance less than 2% of the distance between the outer ends of the side wall portions of each of said conduit members.

11. Apparatus in accordance with claim 1 wherein adjacent conduit members have their pairs of generally radially extending side wall portions at difference included angles.

12. Apparatus in accordance with claim 11 wherein the adjacent side wall portions of adjacent conduit members are generally parallel to each other whereby the total internal cross-sectional area of all of the conduit members will be maximized.

13. Apparatus in accordance with claim 12 wherein alternating conduit members have generally trapezoidal and generally rectangular cross-sections.

14. Apparatus in accordance with claim 9 wherein vertical sealing plates are attached to at least one side edge portion of the inner wall portion of at least some of said conduit members to prevent particulate material from moving into the space between adjacent conduit members.

15. Apparatus in accordance with claim 13 wherein vertical sealing plates are attached to each side edge of the inner wall portion of the conduit members that have a generally rectangular cross-section, said vertical sealing plates having sealing portions extending over the side edges of the inner wall portions of adjacent conduit members which have a trapezoidal shape.

16. Apparatus in accordance with claim 1 wherein all of the conduit members have a generally trapezoidal shaped cross-section.

17. Apparatus in accordance with claim 16 wherein a vertical sealing plate is attached to the same side edge of the inner wall portion of each of the conduit members that have a generally trapezoidal cross-section, each of said vertical sealing plates having a sufficient width as to provide a sealing portion which extends over the side edge of the inner wall portions of adjacent conduit members, whereby the gap between adjacent conduit members will be covered.

18. A radial flow vessel having an inlet and an outlet, comprising:
   an interior wall;
   an axially mounted member;
   a plurality of conduit members arranged to form an interrupted ring adjacent the interior wall, at least one of the plurality of conduit members having a cross-sectional area defined by a pair of generally radially extending side wall portions, an outer wall portion proximate the interior wall, and a permeable wall having a flow opening, wherein the pair of generally radially extending side wall portions are angled away from each other in a generally radially outward direction but at an included angle which is less than if they were truly radial relative to the axis of the vessel, wherein the permeable wall is concave shaped; and
   an annular particulate bed disposed between the plurality of conduit members and the axially mounted member, the annular particulate bed having a substantially uniform radial thickness.

19. Apparatus for supporting and retaining particulate material in a radial flow vessel having inlet and outlet openings for a fluid to pass through the vessel, one of said inlet and outlet openings being in communication with an annular space defined on its outer side by an inner wall of the vessel and the other of said inlet and outlet openings being in communication with an interior of an axially mounted member whose outer surface has openings therein which are smaller than the particulate materials supported thereby, comprising:
   a ring of separate, hollow conduit members positioned against the inner wall of said vessel and arranged in a vertical direction to fill said annular space,
   said separate hollow conduit members each having an internal cross-sectional area defined by a pair of generally radially extending side wall portions and an inner wall portion integrally joined to each of said pair of generally radially extending side wall portions,
   wherein the outer ends of said generally radially extending side wall portions of adjacent conduit members being in contact with said inner wall,
   wherein said pair of generally radially extending side wall portions on at least some of said conduit members being angled away from each other in a generally radially outward direction but at an included angle which is less than if they were truly radial relative to the axis of the vessel,
   wherein the included angle being sufficiently small as to permit individual conduit members to be moved inwardly relative to adjacent conduit members during an installation or replacement operation,
   wherein said inner wall portions of said conduit members having at least a portion of their surface formed by screen members which have flow openings which are of a dimension less than the diameter of the particulate material which forms a uniform thickness particulate bed and which is located in an annular space between the inner wall portions of the conduit members and the outer wall of the axially mounted member,
   wherein adjacent conduit members have their pairs of generally radially extending side wall portions at different included angles.

20. Apparatus in accordance with claim 19, wherein the adjacent side wall portions of adjacent conduit members are generally parallel to each other whereby the total internal cross-sectional area of all of the conduit members will be maximized.

21. Apparatus in accordance with claim 20, wherein alternating conduit members have generally trapezoidal and generally rectangular cross-sections.

22. Apparatus in accordance with claim 21, wherein vertical sealing plates are attached to each side edge of the inner wall portion of the conduit members that have a generally rectangular cross-section, said vertical sealing plates having sealing portions extending over the side edges of the inner wall portions of adjacent conduit members which have a trapezoidal shape.

23. Apparatus in accordance with claim 18, wherein the permeable wall is equidistant from the outer wall along their length.

* * * * *